United States Patent
Sekiya

(10) Patent No.: US 9,213,446 B2
(45) Date of Patent: Dec. 15, 2015

(54) HANDWRITING INPUT DEVICE

(75) Inventor: Kayato Sekiya, Tokyo (JP)

(73) Assignee: NEC CORPORATION, Tokyo (JP)

(*) Notice: Subject to any disclaimer, the term of this patent is extended or adjusted under 35 U.S.C. 154(b) by 693 days.

(21) Appl. No.: 13/264,123

(22) PCT Filed: Mar. 3, 2010

(86) PCT No.: PCT/JP2010/001432
§ 371 (c)(1),
(2), (4) Date: Oct. 12, 2011

(87) PCT Pub. No.: WO2010/119603
PCT Pub. Date: Oct. 21, 2010

(65) Prior Publication Data
US 2012/0032925 A1 Feb. 9, 2012

(30) Foreign Application Priority Data
Apr. 16, 2009 (JP) ................................ 2009-099574

(51) Int. Cl.
*G06F 3/042* (2006.01)
*G06F 3/0354* (2013.01)
*G06K 9/22* (2006.01)

(52) U.S. Cl.
CPC .......... *G06F 3/0425* (2013.01); *G06F 3/03545* (2013.01); *G06K 9/22* (2013.01)

(58) Field of Classification Search
CPC ....................................................... G06F 3/042
See application file for complete search history.

(56) References Cited

U.S. PATENT DOCUMENTS

| | | | |
|---|---|---|---|
| 2004/0085522 A1* | 5/2004 | Honig et al. | 353/121 |
| 2005/0184964 A1* | 8/2005 | Liao et al. | 345/173 |
| 2007/0256136 A1* | 11/2007 | Simske et al. | 726/26 |
| 2007/0279368 A1* | 12/2007 | Shefter | 345/102 |
| 2008/0019616 A1* | 1/2008 | Hotta et al. | 382/313 |
| 2008/0029691 A1* | 2/2008 | Han | 250/224 |
| 2008/0138543 A1* | 6/2008 | Hoshino et al. | 428/29 |
| 2009/0289910 A1* | 11/2009 | Hattori | 345/173 |

FOREIGN PATENT DOCUMENTS

| | | |
|---|---|---|
| JP | 7-111673 B | 11/1995 |
| JP | 2000-330726 A | 11/2000 |
| JP | 2006-273938 A | 10/2006 |
| JP | 2007-257058 A | 10/2007 |
| JP | 2008-276487 A | 11/2008 |

OTHER PUBLICATIONS

Zhengyou Zhang, "A Flexible New Technique for Camera Calibration", IEEE Transactions on Pattern Analysis and Machine Intelligence, Nov. 2000, pp. 1330-1334, vol. 22, No. 11.
Richard Hartley, et al., "Multiple View Geometry in Computer Vision", 2000, 15 pages, Cambridge University Press.
Communication dated Mar. 4, 2014, issued by the Japanese Patent Office in corresponding Application No. 2011-509181.

* cited by examiner

*Primary Examiner* — Carolyn R Edwards
(74) *Attorney, Agent, or Firm* — Sughrue Mion, PLLC

(57) ABSTRACT

This handwriting input device is equipped with an object to be coated 101, a detection means 102, and a display means 103. The object to be coated 101 is transparent or translucent. When a letter or a figure is written or drawn with a coating material, the detection means 102 detects a position in which the coating material attaches on the object to be coated 101. The display means 103 causes a visual change in accordance with the position in which attachment of the coating material is detected by the detection means 102, thereby displaying the letter or figure written or drawn with the coating material.

18 Claims, 24 Drawing Sheets

(a)

(b)

(a) (b)

(a)

(b)

(c)

(d)

HANDWRITING INPUT DEVICE

CROSS REFERENCE TO RELATED APPLICATIONS

This application is a National Stage of International Application No. PCT/JP2010/001432, filed on Mar. 3, 2010, which claims priority from Japanese Patent Application No. 2009-99574, filed on Apr. 16, 2009, the contents of all of which are incorporated herein by reference in their entirety.

TECHNICAL FIELD

The present invention relates to a handwriting input device that mechanically reads information such as a letter and a figure written and drawn on a board surface.

BACKGROUND ART

One example of this type of handwriting input device is an input device having a function of electronically or optically reading a letter and a figure written and drawn by a writing implement called a marker on a white sheet or a whiteboard (hereinafter, referred to as an electronic-blackboard-type handwriting input device), and the input device is widely used majorly in a meeting and a presentation. A reading system is: a board surface moving type that rotates the white sheet by a roller and a motor, applies light to a writing face rotated and moved to the rear side of the device, and converts into an electric signal by a CCD (Charge Coupled Device) line sensor, or the like; and a board surface fixed type that reads by moving a large-size image scanner closely on the surface of the whiteboard. Moreover, a read-data recording system is: a type that records on a paper sheet by thermal printing, ink-jet printing, electrophotographic printing, or the like; and a type that stores into a recording medium such as a Compact Flash™ memory.

Further, another example of a handwriting input device is a handwriting input device that converts a letter and a figure written and drawn on a display device such as a flat panel display by a pen-shaped instrument (a position indicator) into digital data (hereinafter, referred to as a display-type handwriting input device), and the input device is widely used as an input interface of a drawing instrument for graphics design and a digital whiteboard for a conference. A reading system is an electromagnetic induction type, an ultrasonic type, a pressure-sensitive type, etc., and all of the types detect the position coordinates of the pen-shaped instrument on the display device by various kinds of sensors (e.g., refer to Patent Document 1). The display-type handwriting input device changes the color of a pixel in the detected position coordinates on the display device, whereby a user can input a letter and a figure into a computer as if writing by a pen or a pencil on paper. Next, by executing computer processing such as an optical character recognition (OCR) process in real time on the inputted letter and figure, it is possible to display the inputted letter and figure written and drawn by hand on a display immediately after the letter and figure are inputted, which helps increase of the user's ability to express. Furthermore, it is also possible to use the inputted handwritten letter and figure as input parameters of the computer. For example, by interpreting the inputted figure as a boarder (e.g., a wing of an airplane) in fluid simulation and displaying an arrow representing the flow of fluid therearound together, it is possible to perform various kinds of design works as if sketching in consideration of the flow of the fluid occurring around the drawn figure. This is especially useful for outline design, which is the initial stage of design works.

Some of the display-type handwriting input devices, by using a plurality of position indicators having different identifiers or a position indicator that can change identifiers by a switch, can cause a computer to execute processes corresponding to the identifiers. For example, it is possible to realize an operation of inputting a letter and a figure by one position indicator and erasing the inputted letter and figure by another position indicator.

FIG. 24 is a block diagram showing an example of a display-type handwriting input device described in Patent Document 1. Loop coils C1 to C48 and C1' to C48' generate an electromagnetic field or convert a change of the electromagnetic field into electric current when alternating current is flown therethrough. An X-direction (Y-direction) selection circuit 221X (221Y) selects a loop coil to be used from among the plurality of loop coils. An X-direction (Y-direction) connection switching circuit 222X (222Y) exclusively connects the loop coil being used to a transmission circuit 223 or a reception circuit 224. The transmission circuit 223 and the reception circuit 224 generate and detect an alternating current signal of a given frequency, respectively. A processing device 225 executes control of the whole device and processing of the detected signal. A position indicator 226 incorporates a tuned circuit 227 that oscillates in tune with an electromagnetic field of a specific frequency. Then, a display device 228 displays information in accordance with the result of the processing of the detected signal.

An operation of this device will be described. Firstly, the transmission circuit 223 generates an alternating current of a frequency f1. This alternating current signal is sent out to one of the loop coils, for example, the loop coil C1 (C1') via the X-direction (Y-direction) connection switching circuit 222X (222Y) and the X-direction (Y-direction) selection circuit 221X (221Y), and is converted into an electromagnetic field of the frequency f1 by the loop coil C1 (C1'). At this moment, when the position indicator 226 incorporating the tuned circuit 227 tuned to the frequency f1 is in the vicinity of the loop coil C1 (C1'), the tuned circuit 227 oscillates. After that, when a connection destination of the loop coil C1 (C1') is changed from the transmission circuit 223 to the reception circuit 224 by the X-direction (Y-direction) connection switching circuit 222X (222Y), the electromagnetic field generated by the loop coil C1 (C1') immediately disappears, but the oscillating tuned circuit 227 gradually discharges electricity. During this time, the position indicator 226 generates an electromagnetic field of the frequency f1. The electromagnetic field generated by the position indicator 226 is converted into an alternating current signal of the frequency f1 by the loop coil C1 (C1'), and detected by the reception circuit 224 via the X-direction (Y-direction) selection circuit 221 X (221 Y) and the X-direction (Y-direction) connection switching circuit 222X (222Y). Then, the reception circuit 224 transmits detection of the position indicator 226 in the position of the loop coil C1 (C1') to the processing device 225. The processing device 225 repeatedly executes this operation while sequentially changing a loop coil to be used, thereby detecting the X-coordinate and Y-coordinate of the position indicator 226. Then, the display device 228 changes the color of a pixel in the detected position coordinates to a color different from the background color, and feeds back detection of the position indicator 226 in that position to the user.

Although not directly described in Patent Document 1, it is possible to realize the operation of inputting a letter and a figure by one position indicator and erasing the inputted letter and figure by another position indicator. For example, the transmission circuit 223 further generates an alternating current signal of a frequency f2 different from the frequency f1 subsequently. As a result, the position coordinates of another position indicator incorporating a tuned circuit that oscillates in tune with the frequency f2 are detected. The display device 228 changes the colors of pixels around the detected position coordinates of the position indicator tuned to the frequency f2 to the background color, whereby the user's operation of erasing the inputted letter and figure is realized. In the case of using a position indicator that can change a tuned circuit oscillating at a plurality of different frequencies by a switch, it is possible to detect the position coordinates of a single position indicator and the state of a change by the switch instead of the position coordinates of a plurality of different position indicators, so that the user can switch between a drawing mode or an erasing mode by the switch.

[Patent Document 1] Japanese Patent Publication No. 2139446

[Non-Patent Document 1] Z. Zhang, "A flexible new technique for camera calibration," IEEE Transactions on Pattern Analysis and Machine Intelligence, Vol. 22, Issue 11, pp. 1330 to 1334, 2000

[Non-Patent Document 2] Richard Hartley, et al., "Multiple View Geometry in Computer Vision," Cambridge University Press, pp. 32 to 37, 2000

The greatest merit of a handwriting input device is that a letter and a figure can be converted into digital data by an operation method that many users have already learned, which is writing a letter and drawing a figure by a pen-shaped instrument such as a marker on a working plane such as a whiteboard. In other words, use of a handwriting input device makes it possible to easily use various kinds of processing abilities of a computer without learning a method of operating an input device such as a keyboard and a mouse specialized for a computer.

However, in the case of an electronic-blackboard-type handwriting input device, it is impossible to recognize a letter or a figure written or drawn on a white sheet or a whiteboard in a dark place. Therefore, for example, when making a presentation in a dark room to show slides, it is difficult to use the electronic-blackboard-type handwriting input device.

On the other hand, because a display-type handwriting input device displays a written letter and a drawn figure on a display screen, not only it has no problem even in a dark atmosphere, but also it makes easy to visually recognize. However, unlike the electronic-blackboard-type handwriting input device that leaves a letter and a figure written and drawn by hand on a white sheet or a whiteboard, the display-type handwriting input device stores the inputted letter and figure only as digital data in a computer. Therefore, in case the stored digital data is lost, input information is completely lost. Moreover, while the electronic-blackboard-type handwriting input device allows an operation of erasing all or part of written letters and drawn figures without using a special instrument such as tissue paper and a fingertip, the display-type handwriting input device needs a special instrument (e.g., a dedicated position indicator).

Thus, the electronic-blackboard-type handwriting input device and the display-type handwriting input device each have a merit and a demerit.

SUMMARY

An object of the present invention is to provide a handwriting input device that solves the abovementioned problems: it is difficult to use in a dark place; there is a risk that input information is completely lost in case digital data is lost; and it is impossible to erase all or any part of written letters and drawn figures without using a special instrument.

A handwriting input device according to an exemplary embodiment of the present invention is equipped with: a transparent or translucent object to be coated; a detection means configured to detect a position in which a coating material attaches on the object to be coated; and a display means configured to cause a visual change in accordance with the position where attachment of the coating material is detected by the detection means.

Because the present invention is configured as described above, it is possible to use in a dark place, it is possible to prevent loss of input information even if digital data is lost, and it is possible to erase all or any part of written letters and drawn figures without using a special instrument.

EXEMPLARY EMBODIMENTS

[First Exemplary Embodiment]

Next, a first exemplary embodiment of the present invention will be described in detail with reference to the drawings.

[Description of Configuration]

Figure 1:
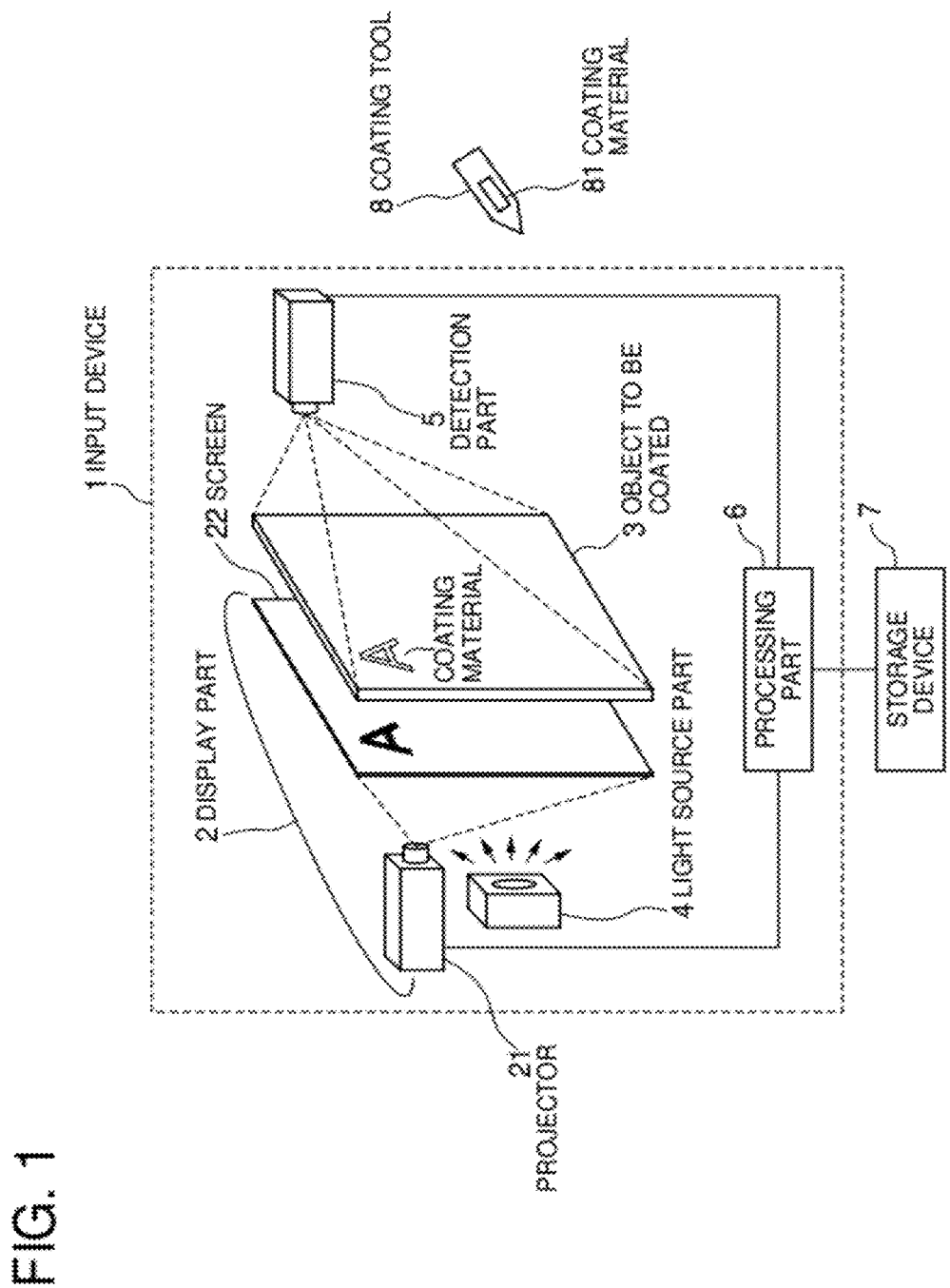
FIG. 1 is a block diagram of a first exemplary embodiment.

With reference to FIG. 1, an input device 1 of the present invention is connected to a storage device 7, and is configured by a display part 2 configured by a projector 21 and a screen 22, an object to be coated 3 to and from which a coating material is attached and removed, a light source part 4, a detection part 5, and a processing part 6.

The projector 21 projects an image inputted by the processing part 6 onto the screen 22. A general liquid-crystal projector can be used as the projector 21, and a resin film that diffuses light can be used as the screen 22.

The object to be coated 3 is a transparent plane board to and from which a coating material can be attached and wiped off, for example, a thin plastic board. The drawing shows the screen 22 and the object to be coated 3 separated from each other, but actually, it is desirable that the screen 22 is attached to the rear face of the object to be coated 3. Moreover, instead of forming a base member to which the screen 22 is attached as the object to be coated 3, it is possible to use the screen 22 as the object to be coated 3.

Figure 2:
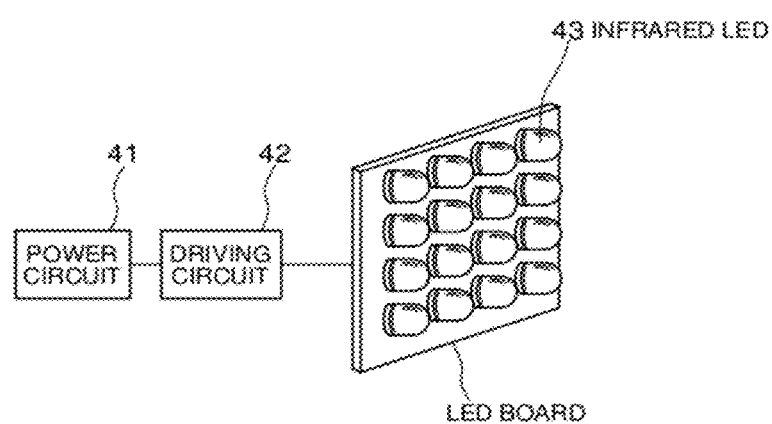
FIG. 2 is a detailed block diagram of a light source part of FIG. 1.

The light source part 4 emits light except the visible light, such as infrared light, to the rear face of the object to be coated 3 via the screen 22 from above obliquely. The light source part 4 can be, for example, one or more infrared light emitting diodes (LED) 43 driven by a power circuit 41 and a driving circuit 42 as shown in FIG. 2.

The detection part 5 is an optical apparatus that detects a position in which a coating material attaches on the object to be coated 3 by using the light emitted by the light source part 4 and, for example, a camera equipped with a semiconductor image sensor such as a charge coupled device (CCD) image sensor and a complementary metal oxide semiconductor (CMOS) image sensor can be used.

Figure 3:
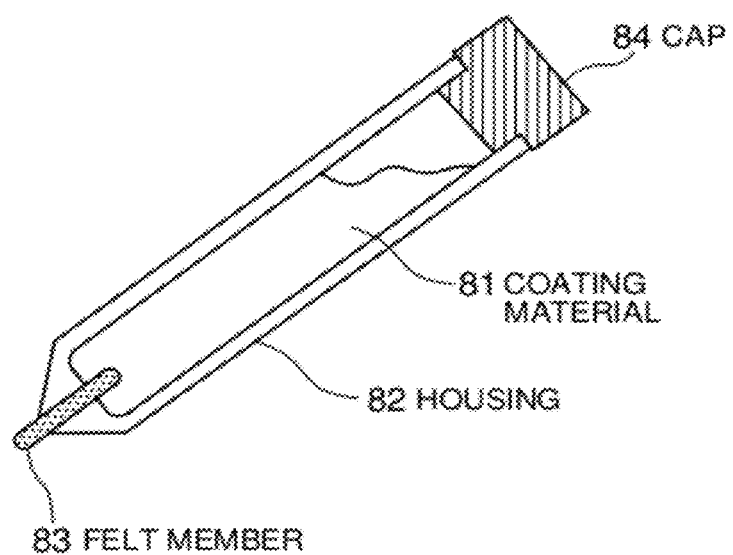
FIG. 3 is a detailed block diagram of a coating tool of FIG. 1.

A coating tool 8 is a container having a structure to apply a coating material 81 filled therein to the object to be coated 3, and a container of a felt pen such as a whiteboard marker can be used. An example of the structure of the coating tool 8 is shown in FIG. 3. The coating tool 8 of this example has a structure that a felt member 83 is placed in a through hole formed at the tip portion of a pen-shaped housing 82 and the coating material 81 filled in the housing 82 always permeates the felt member 83 by capillary action. A cap 84 attached to the back end of the housing 82 is removable so that it is possible to replenish with the coating material 81.

The coating material 81 is made by dissolving at least an optical material described later into a liquid such as a volatile solvent, and has a property of being substantially transparent (or translucent) with respect to visible light (i.e., all of the components contained in the coating material 81 have a property of being substantially transparent (or translucent) with respect to visible light). As the volatile solvent, for example, an alcohol solvent can be used. The optical material is a material that is substantially transparent (or translucent) with respect to visible light but absorbs light in the wavelength region of the light emitted by the light source part 4. As the optical material, for example, infrared absorption ink used for invisible barcode printing, such as ytterbium oxide, can be used. The coating material 81 may further contain, other than the optical material, a resin material that assists attachment of the optical material to the object to be coated 3, and a separating material for making it easy to wipe off the optical material and the resin material from the object to be coated 3. As the resin material and the separating material, those contained in a general whiteboard marker can be used. The coating material 81, which is initially liquid, attaches to the object to be coated 3 as a solid due to vaporization of the volatile solvent shortly after being applied to the object to be coated 3. In this description, both the liquid-state material before the volatile solvent vaporizes and the material attached to the object to be coated 3 as a solid material after vaporization of the volatile solvent will be referred to as a coating material.

The processing part 6 receives an image of the object to be coated 3 and the coating material attached thereto shot by the detection part 5 in the wavelength region of the light emitted by the light source part 4 and, when necessary, executes image processing such as brightness regulation and distortion correction, and outputs to the display part 2 and the storage device 7. As the processing part 6, for example, a general personal computer (PC) that is equipped with an interface for connection of an external apparatus and a video card for display output and executes a general-purpose operating system, driver software and an image processing program can be used.

The storage device 7 is an apparatus that stores the result of input by the input device 1 and, for example, can be a primary storage device and a secondary storage device of the aforementioned PC.

Figure 4:
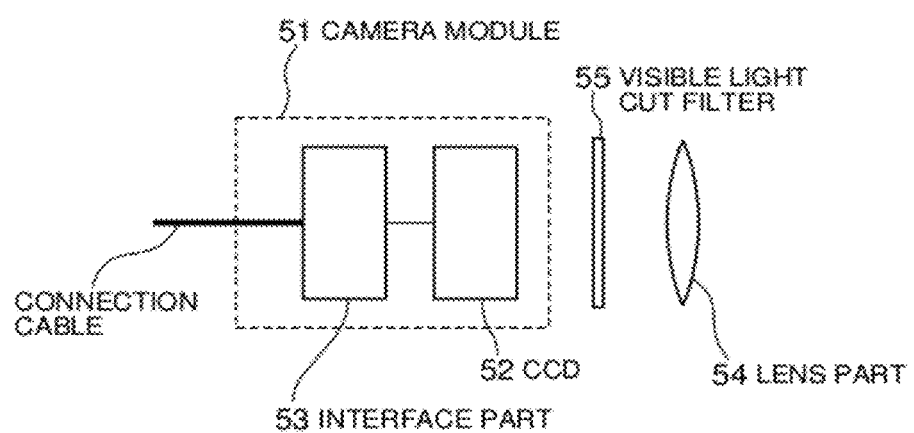
FIG. 4 is a detailed block diagram of a detection part of FIG. 1.

FIG. 4 is a block diagram showing a configuration example of the detection part 5. With reference to FIG. 4, the detection part 5 includes a camera module 51 configured by a CCD 52 and an interface part 53, a lens part 54, and a visible light cut filter 55.

The CCD 52 is an element that performs photoelectric conversion of the brightness of light entering via the lens part 54 and the visible light cut filter 55 into the amount of electric charge, and the CCD 52 has sensitivity in a wavelength region of the light generated by the light source part 4. The interface part 53 is an element that performs analog-digital conversion of an electric signal inputted from the CCD 52 and converts into a predetermined transfer format, and a standard such as CameraLink and IEEE 1394 can be used as the transfer format, for example. The camera module 51 composed of the CCD 52 and the interface part 53 may be, for example, a CameraLink camera and an IEEE 1394 camera, which are generally available. The lens part 54 is an element that collects light entering from an objective of image shooting and guides to the CCD 52, and may be a generally available camera lens. The visible light cut filter 55 is an element that removes most of visible light of the light guided to the CCD 52 by the lens part 54, and the visible light cut filter 55 enables the detection part 5 to detect a position in which a coating material attaches on the object to be coated 3 by using the light emitted by the light source part 4. As the visible light cut filter 55, for example, a multilayer interference filter can be used.

[Description of Operation]

Next, an operation of the handwriting input device of FIG. 1 will be described in detail with reference to the drawings.

Figure 5:
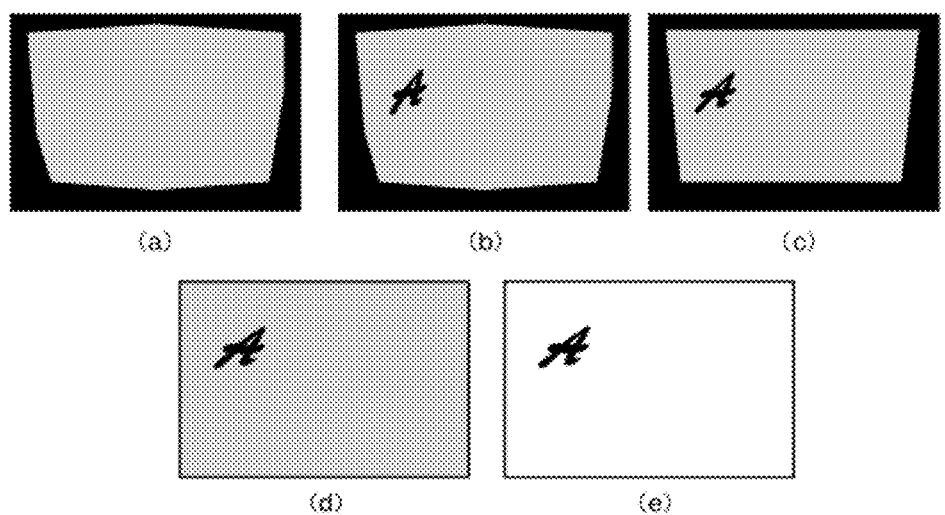
FIGS. 5A to 5E are views showing image frames recorded by the detection part and the result of processing by a processing part in FIG. 1.

The detection part 5 shoots images of the object to be coated 3 and a coating material attached thereto outside the visible light region constantly, for example, at 60 frames per second. Assuming any coating material is not attached to the object to be coated 3, one of the images (an image frame) recorded by the detection part 5 is as shown by FIG. 5A, for example. In the drawing, a bright portion represents the object to be coated 3 to which the screen 22 is attached, and a surrounding dark part is an image of the periphery of the object to be coated 3. The object to be coated 3 looks bright because the light except the visible light emitted by the light source part 4 is diffused by the screen 22 attached to the object to be coated 3 and reaches the detection part 5. Although visible light also reaches the detection part 5, it is blocked by the visible light cut filter 55 and therefore does not appear in the result of image shooting. The object to be coated 3 that is originally rectangular looks distorted because of lens distortion and keystone distortion, which will be described later.

Next, a case in which a coating material is attached to the object to be coated 3 will be described, and such a state results from the user's operation as described below, for example. When the user moves the felt member 83 of the coating tool 8 of FIG. 3 in contact with the object to be coated 3, the coating material 81 having permeated the felt member 83 by capillary action is applied to the object to be coated 3. After a lapse of a given time from application of the coating material 81, the volatile solvent contained in the coating material 81 vaporizes into the air, and a component such as the optical material contained in the coating material 81 remains as a solid on the object to be coated 3. Although a method of attaching a coating material to the object to be coated 3 by using a coating tool having a shape as shown in FIG. 3 is described herein, this method does not restrict a method of attaching a coating material to the object to be coated 3. Various methods, for example, pressing a rubber stamp to which the coating material 81 is attached to the object to be coated 3 can be considered.

For the sake of description, it is assumed that the user has drawn an alphabetical letter 'A' on the object to be coated 3 by using the coating tool 8. In this case, an image frame recorded by the detection part 5 is, for example, as shown in FIG. 5B. A portion having a shape of 'A' that appears dark within a white rectangular region is a portion to which the coating material is attached on the object to be coated 3. The portion to which the coating material is attached thus looks dark is because the optical material that is the component of the coating material absorbs light except the visible light diffused by the screen 22. Therefore, the absorption rate of the optical material with respect to the light except the visible light needs to be high to a degree that the detection part 5 can record by distinguishing a portion to which the coating material is attached from a portion to which the coating material is not attached. Because the coating material is substantially transparent (or translucent) in the visible light region, the user cannot recognize the coating material attached to the object to be coated 3 with the naked eye.

Figure 6:
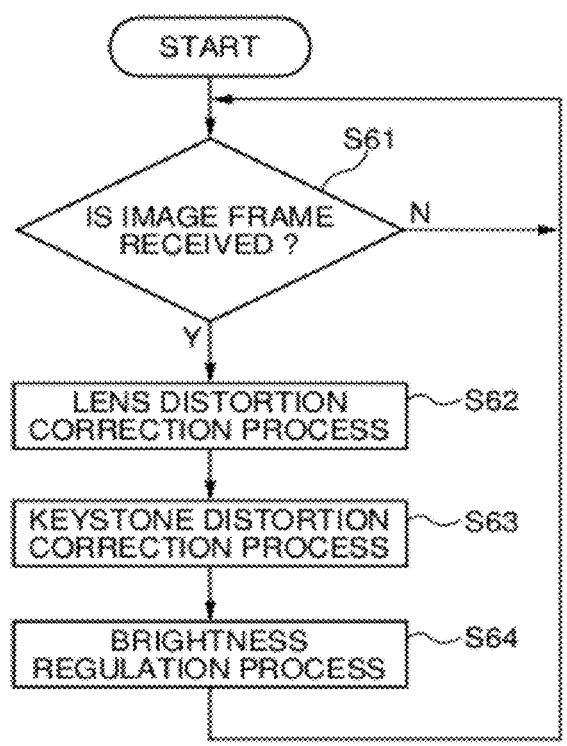
FIG. 6 is a flowchart of image processing executed by the processing part of FIG. 1.

An image frame recorded by the detection part 5 is sent to the processing part 6 next. By the processing part 6, image processing such as brightness regulation and distortion correction is executed. FIG. 6 is a flowchart showing an example of the image processing executed by the processing part 6.

Figure 7:
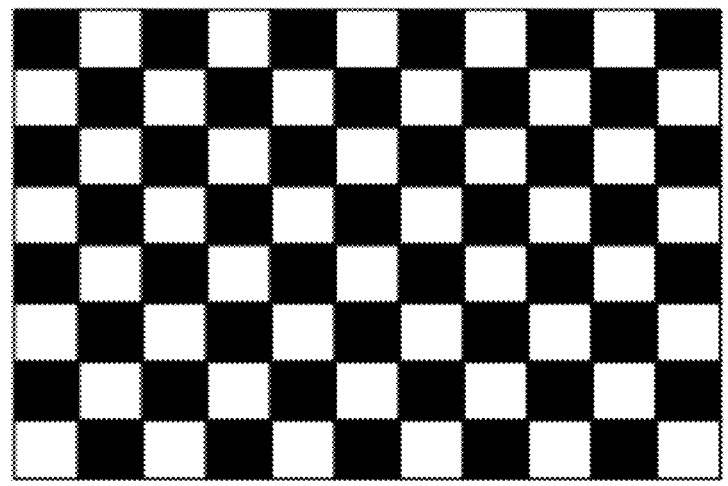
FIG. 7 is a view showing a gray code pattern used in a lens distortion correction process executed by the processing part of FIG. 1.

The processing part 6 monitors reception of an image frame from the detection part 5 (step S61 of FIG. 6) and, every time receiving an image frame, firstly executes a lens distortion correction process (step S62). Lens distortion is a phenomenon that a straight side of an object looks distorted like a curved line due to the optical property of the lens part 54 and is particularly outstandingly caused when a wide-angle lens is used. The lens distortion correction process is a process of removing this distortion. For execution of the lens distortion correction process, firstly, the detection part 5 previously shoots a gray code pattern as shown in FIG. 7 to derive a correction function. Then, in the lens distortion correction process, this correction function is applied to each pixel of the image frame and lens distortion is removed. Because a method of correcting lens distortion is described in detail in, for example, Non-Patent Document 1, a detailed description of algorithm will be omitted.

By execution of the lens distortion correction process, lens distortion is removed, and the image frame shown in FIG. 5B becomes an image frame as shown in FIG. 5C. Although distortion like a curved line is removed by the lens distortion correction process at step S62, the object to be coated 3 that is originally rectangular still looks like a trapezoid. This distortion, which is called keystone distortion, occurs because the detection part 5 shoots an image of the object to be coated 3 from above. Moreover, an unnecessary image (a dark portion) appears around the object to be coated 3. In the keystone distortion correction process (step S63), a process of removing keystone distortion and also removing the unnecessary image around the object to be coated 3 is executed.

Figure 8:
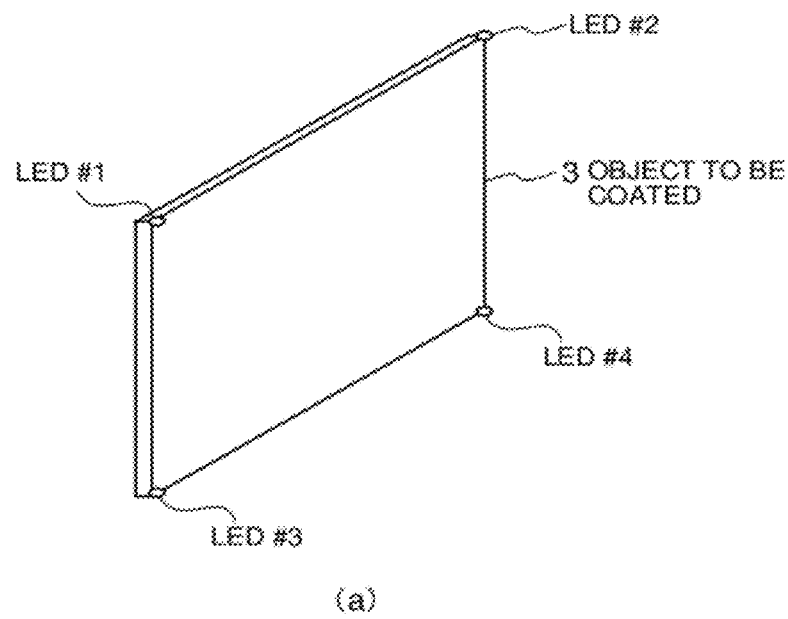
FIGS. 8A and 8B are views showing a light-emitting diode (LED) used in a keystone correction process executed by the processing part and the result of image shooting by the detection part in FIG. 1.
Figure 8:
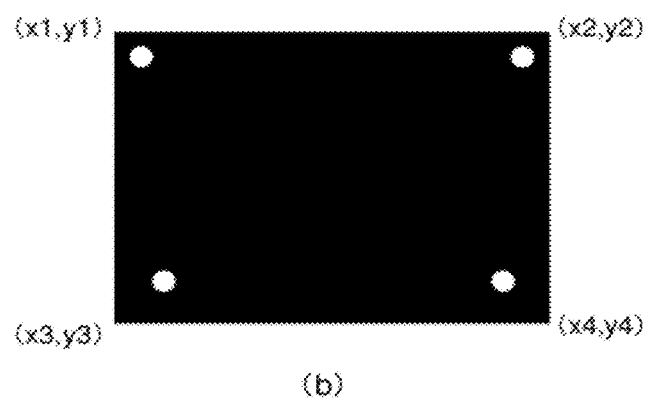

For removing keystone distortion, firstly, projection transformation necessary for correction is previously derived from coordinates within the image frame of the four corners of the object to be coated 3. Then, in the keystone distortion correction process, this projection transformation is applied to each pixel of the image frame and keystone distortion is removed. For example, as shown in FIG. 8A, LEDs #1 to #4 that emit light except the visible light are placed at the four corners of the object to be coated 3, and the detection part 5 shoots an image in a state that the light source part 4 does not emit light. These LEDs #1 to #4 may be placed at the four corners of the object to be coated 3 at all times, or may be temporarily placed at the time of image shooting. When lens distortion is removed from the result of image shooting by the method of step S62, an image frame as shown in FIG. 8B is obtained. Assuming: the coordinates within the image frame of the LEDs #1 to #4 are $p1=(x1, y1)$, $p2=(x2, y2)$, $p3=(x3, y3)$ and $p4=(x4, y4)$, respectively; and the size of the image frame is W pixels×H pixels, the coordinates of the four corners of the image frame are given as $p1'=(0, 0)$, $p2'=(W-1, 0)$, $p3'=(0, H-1)$ and $p4'=(W-1, H-1)$, respectively. In this case, projection transformation necessary for keystone distortion correction is defined as a matrix that converts points p1 to p4 into points p1' to p4', respectively, and can be obtained by inverse matrix calculation from the points p1 to p4 and the points p1' to p4'. Because a method of correcting keystone distortion is described in detail in, for example, Non-Patent Document 2, a detailed description of the algorithm will be omitted herein. By execution of the keystone correction process, keystone distortion is removed, and the image frame shown in FIG. 5C becomes an image frame as shown in FIG. 5D.

Figure 9:
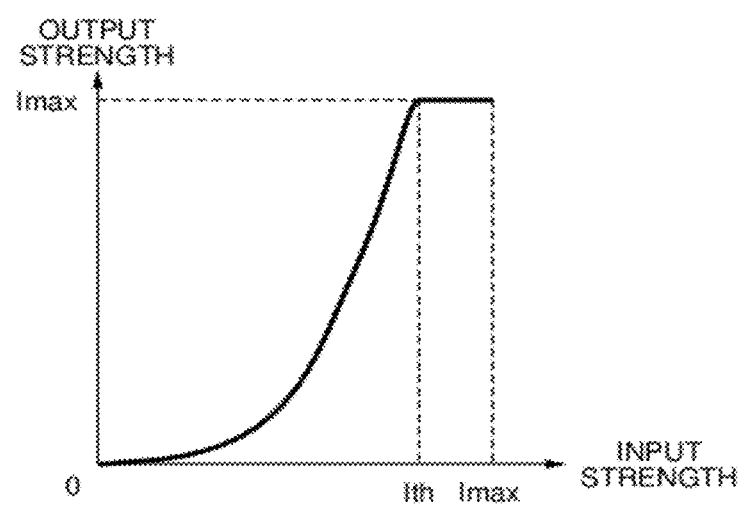
FIG. 9 is a view showing a correspondence relation between input strength and output strength used in a brightness regulation process executed by the processing part of FIG. 1.

Next, the processing part 6 executes a brightness regulation process (step S64). In the brightness regulation process, the intensity of each pixel of an image frame is regulated by using a correspondence relation shown in FIG. 9, for example. Herein, it is assumed that the pixel intensity is represented by an integer value of 0 to Imax. According to FIG. 9, pixels with intensity Ith or more are converted into intensity Imax, and pixels with intensity 0 to Ith are allocated to intensity 0 to Imax. As a result, the contrast of the image frame shown in FIG. 5D is improved, and an image frame as shown in FIG. 5E is obtained.

An image frame processed by the processing part 6 is outputted to the storage device 7 and the display device 2. For example, in a case that the detection part 5 shoots images of the object to be coated 3 and the coating material attached thereto at sixty frames per second, sixty image frames per second are outputted from the processing part 6. The storage device 7 constantly records the image frames outputted from the processing part 6 as a moving image, or records as a still image at the timing of the user's instruction. At this moment, a proper image compression process may be executed for reduction of necessary storage capacity.

Every time an image frame is outputted from the processing part 6, the display part 2 displays the image frame. Because the points on the object to be coated 3 and the points on the screen 22 overlap, respectively, as a result of the distortion correction process by the processing part 6, the letter 'A' written by the user in a position in which the coating material is attached on the object to be coated 3 is displayed. The description is made herein assuming the display resolution of the display part 2 is identical to the resolution of an image frame shot by the detection part 5, but in a case that the display resolution is different from the resolution of the image frame, the image frame may be properly scaled by the processing part 6 and then displayed by the display part 2.

As already mentioned, because the coating material is substantially transparent (or translucent) in the visible light region, the user can hardly recognize the coating material attached to the object to be coated 3 with the naked eye. Therefore, the user can see through a shot image of the coating material on the screen 22. Assuming a delay is sufficiently short before an image of the optical material contained in the coating material applied to the object to be coated 3 is shot by the detection part 5 and displayed on the display part 2, the user can recognize the shot image of the coating material in the same position on the screen immediately after the coating material is applied. Therefore, by the handwriting input device of this exemplary embodiment, the user can input a letter and a figure as if writing and drawing by general ink that absorbs visible light.

When erasing an inputted letter or figure in the handwriting input device of this exemplary embodiment, it is possible to remove a coating material at a corresponding portion on the object to be coated 3 so that the portion does not absorb light except the visible light. At this moment, because the coating material is physically attached on the object to be coated 3, it is possible to directly wipe off by a general object such as tissue paper and a finger without using a special instrument.

In a case that, at the time of erasing an inputted letter or figure, designation of the size and shape of a region to be the target of erasing is required, the area of the object used for wiping off the coating material in contact with the object to be coated 3 can be considered. For example, assuming a whiteboard eraser generally used for wiping is used, it is possible to wipe off the coating material by bringing the whole face of the eraser into contact when erasing a large region, whereas bringing only a corner of the eraser into contact with the object to be coated 3 when erasing a small region. Because the coating material is physically attached on the object to be coated 3, the user can easily designate the size and shape of the erasing target region by using the area and shape of a contact portion of the object to be coated 3 and the wiping object.

Figure 20:
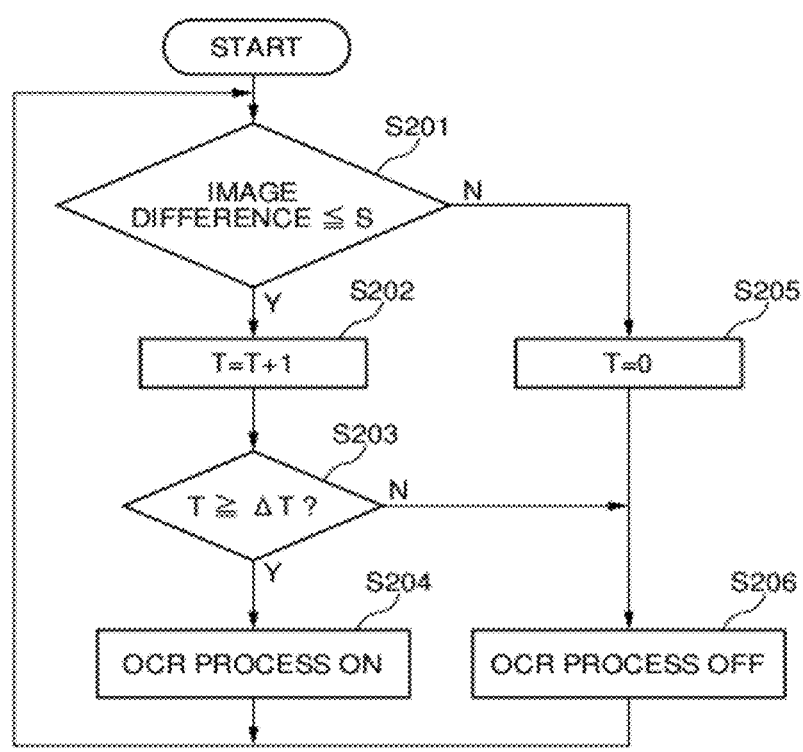
FIG. 20 is a flowchart showing an example of a process additionally executed by the processing part of FIG. 1 when an optical character recognition process is executed.

A configuration of displaying a shot image of a coating material in the same position as a position of the coating material recorded by the detection part 5 has been described above. On the other hand, it is also possible to configure to execute computer processing such as the optical character recognition (OCR) process in real time on an inputted letter or figure and display the inputted letter or figure written or drawn by hand on a screen as a printed word or a well-shaped figure. FIG. 20 is a flowchart showing an example of processing additionally executed by the processing part in this configuration.

Firstly, the processing part 6 calculates an image difference between a last image frame and an image frame (step S201 of FIG. 20). The image difference can be calculated by using the frame difference technique generally known in the field of image processing. Then, in a case that the image difference is a threshold or less, the processing part 6 increases timer T by 1 (step S202). Next, the processing part 6 evaluates the value of T (step S203) and, in a case that T is a threshold ΔT or more, turns on the OCR process (step S204). On the other hand, in a case that the image difference is more than the threshold (step S205), the processing part 6 resets timer T to 0 and turns off the OCR process (step S206). That is to say, in a case that an image frame remains unchanged for a given time (ΔT) or more, the OCR process is executed. When the OCR process is executed, a handwritten letter within the image frame is shaped into a printed letter and then outputted to the display part 2.

Figure 21:
FIGS. 21A to 21D are views showing information displayed on the display part of FIG. 1 when the optical character recognition process is executed.
Figure 21:
Figure 21:
Figure 21:

For example, it is assumed that, as shown in FIG. 21C, the user writes a text of a word 'Hello' on the object to be coated 3 by the coating tool 8. Because the detection part 5 constantly records an image of the object to be coated 3 and the coating material attached thereto, information displayed by the display part 2 changes in stages as shown in FIGS. 21A to 21C while the user is inputting the text. On the other hand, when the user finishes inputting the text, the image frame does not change any more from the state shown in FIG. 21C. Then, after a lapse of a given time, the OCR process is turned on, and well-shaped printed letters are displayed in the vicinity of the attached coating material as shown in FIG. 21D.

Subsequently, when the user brings a whiteboard eraser into contact with the vicinity of the well-shaped printed letters, part of the coating material attached to the vicinity is removed and a change is caused in the image frame. Because the OCR process is turned off when a change is caused in the image frame, the handwritten letters are again displayed on the display part 2. Therefore, the user can erase the letter having already been inputted and subjected to the OCR process, by merely placing the eraser around the printed letter to display the handwritten letter again and wiping off.

In the example described above, computer processing such as the OCR process is executed by using an image difference, but it is also possible to easily consider a configuration that a proximity sensor is installed in the input device 1 and the computer processing is turned on when the user gets away from the object to be coated 3 and is turned off when the user comes close thereto again.

Thus, according to the first exemplary embodiment, when letters or figures are written or drawn on the surface of the object to be coated 3 by using the coating material, a position in which the coating material is attached is detected by the detection part 5, and the letters or figures are displayed in the same position on the screen 22 by the display part 2 placed in the rear of the object to be coated 3. The object to be coated 3 is transparent or translucent, and the coating material is transparent and translucent. Therefore, in both a bright place and a dark place, the user can see the letters or figures displayed on the screen 22 through the object to be coated 3 and the coating material.

Further, information of the letters or figures written or drawn by hand are stored as a distribution of the coating material physically attached to the object to be coated 3. Therefore, even if digital data recorded in the storage device 7 is lost, it is only required to again detect the letters or figures written or drawn by using the coating material, so that it is possible to prevent complete loss of input information.

Further, at the time of erasing the inputted letters or figures displayed by the display part 2, any special instrument is not necessary, and it is possible to erase by using a general object such as tissue paper and a finger. This is because the letters or figures inputted by the user and already converted into digital data remain on the surface of the object to be coated 3 as a material that can be touched. Therefore, by wiping off this by a general object such as tissue or a finger, the user can erase.

When erasing the inputted letters and figures displayed by the display part 2, it is also possible to easily designate the size and shape of a region to be the target of erasing. This is because the letters and figures inputted by the user and already converted into digital data remain on the surface of the object to be coated 3 as a material that can be touched. Therefore, by regulating the area of the instrument used for erasing coming in contact with an operation face, the user can designate the size and shape of the erasing target region. Therefore, it is possible to easily erase by a known sense of erasing in accordance with a contact area at the time of wiping off, which is learned by the user through a daily life.

[Second Exemplary Embodiment]

As a second exemplary embodiment of the present invention, a configuration in which a basic configuration is as described above but the arrangement of the light source part of the input device 1a, the configuration of the display part and the property of the coating material are different from those of the first exemplary embodiment will be described in detail with reference to the drawings.

Figure 10:
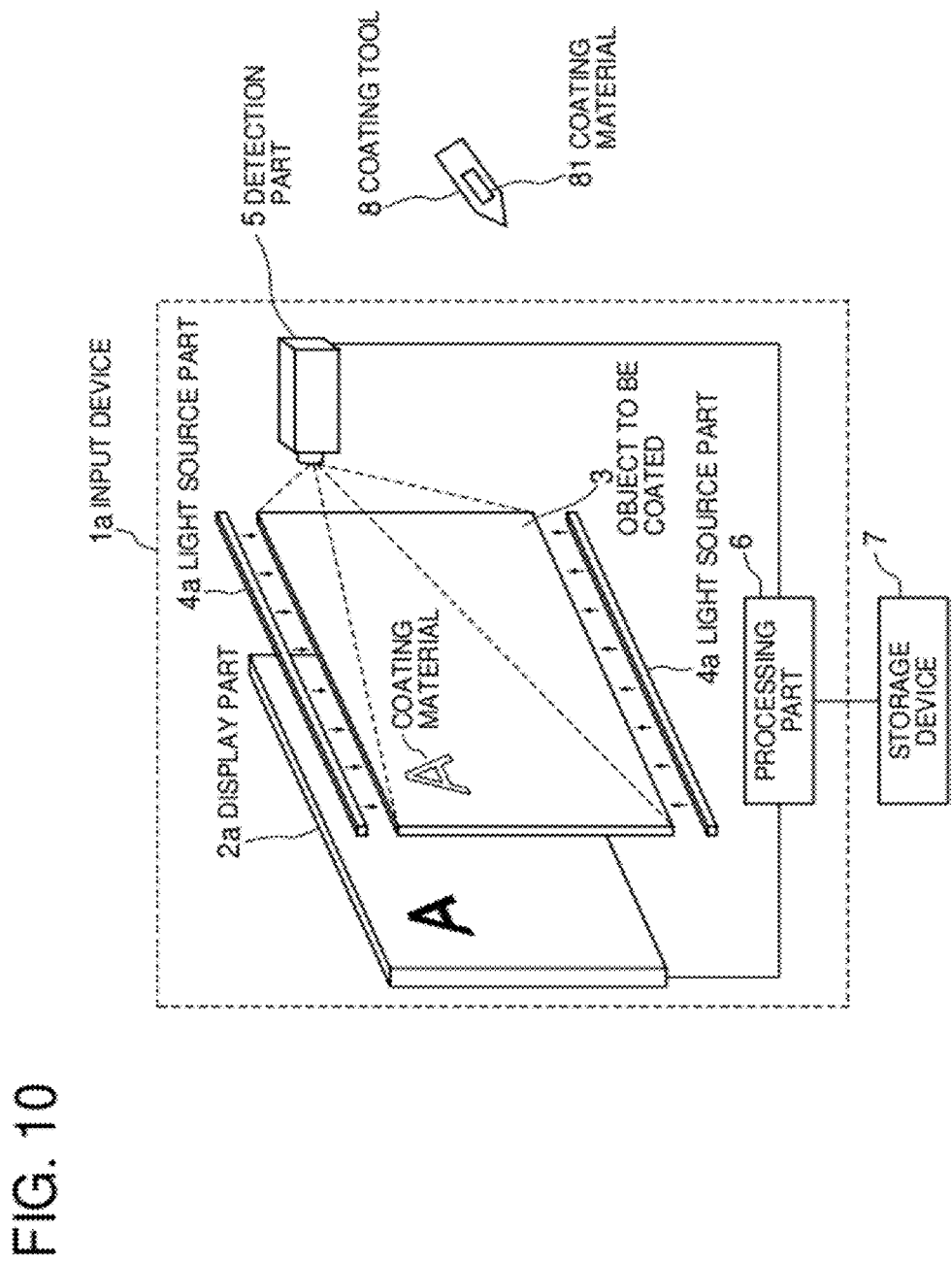
FIG. 10 is a block diagram of a second exemplary embodiment.
Figure 11:
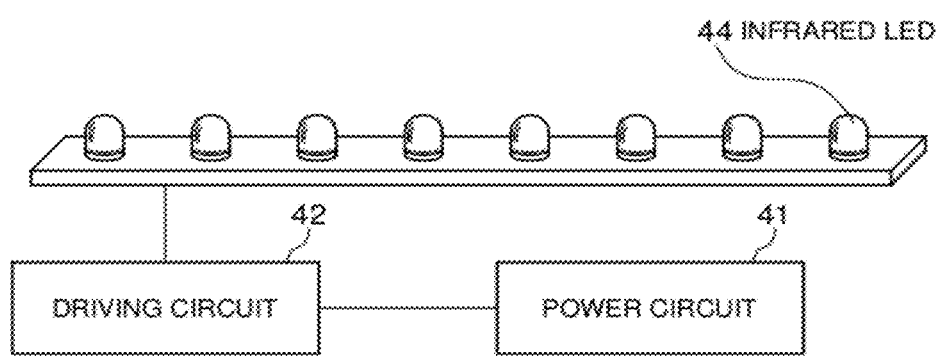
FIG. 11 is a detailed block diagram of a light source part of FIG. 10.

With reference to FIG. 10, a light source part 4a emits light except the visible light so as to enter from the side face of the object to be coated 3. In the light source part 4a, for example, one or more infrared emitting diodes (LED) 44 arranged in line and driven by the power circuit 41 and the driving circuit 42 can be used. The light source part 4a may be placed on one side of the object to be coated 3, or may be placed on a plurality of sides. FIG. 10 shows an example that the light source parts 4a are placed in two places, above and below the object to be coated 3.

A display part 2a is a flat panel display such as a liquid crystal display, a plasma display, and a field emission display. The object to be coated 3 is a protection panel such as a plastic board or a glass board placed on the front face of the flat panel display. Although the display part 2a and the object to be coated 3 are separated from each other in the drawing, it is desirable actually that they are placed in close contact with each other. The optical material contained in the coating material is a material that is substantially transparent (or translucent), with respect to visible light but reflects or diffuses the light except the visible light emitted by the light source part 4a. As such a material, for example, a cholesteric liquid crystal polymer that reflects only infrared light can be used. The configuration other than described above is basically as in the first exemplary embodiment.

An operation of a handwriting input device of the second exemplary embodiment of the present invention will be described.

Figure 12:
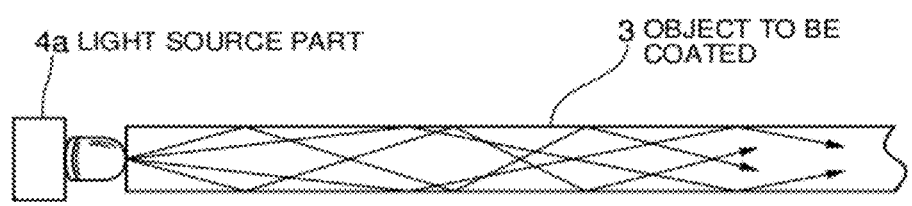
FIG. 12 is a view for describing an aspect that light generated by the light source part of FIG. 10 is guided inside an object to be coated.

The light source part 4a emits light except the visible light so as to enter from the side face of the object to be coated 3. In a case that the coating material is not attached to the object to be coated 3, the incident light is totally reflected on the surface of the object to be coated 3 and internally trapped to be guided as shown in FIG. 12.

Figure 13:
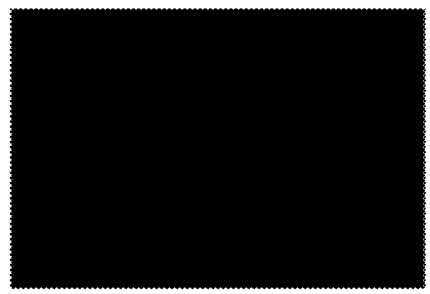
FIGS. 13A and 13B are views showing image frames recorded by a detection part of FIG. 10.
Figure 13:

The detection part 5 constantly shoots images of the object to be coated 3 and the coating material attached thereto outside the visible light region as in the first exemplary embodiment. An image frame recorded by the detection part 5 is almost black as shown in FIG. 13A, for example. This is because the light emitted by the light source part 4a is trapped inside the object to be coated 3 and does not reach the detection part 5.

Next, a case that the coating material is attached to the object to be coated 3 will be described.

Figure 14:
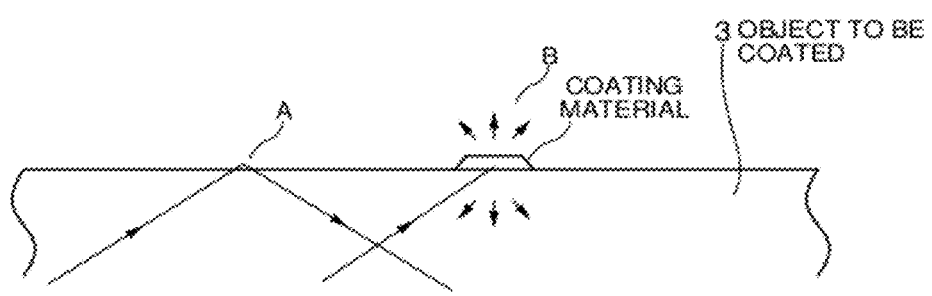
FIG. 14 is a view for explaining an aspect that the light guided inside the object to be coated of FIG. 12 is diffused to the outside of the object to be coated by a coating material.

As mentioned before, the light except the visible light emitted by the light source part 4 is totally reflected on the surface of the object to be coated 3. At this moment, as shown by symbol A in FIG. 14, the light slightly seeps to the outside air side from the object to be coated 3. This seeping part of the light is called evanescent light. In a case that the coating material is attached to the object to be coated 3, the evanescent light optically couples with the optical material contained in the coating material, and is diffused to the outside of the object to be coated as shown by symbol B in FIG. 14. Because part of the diffused light reaches the detection part 5, an image by a frame recorded by the detection part 5 when an alphabetical letter 'A' is written, as shown in FIG. 13B, for example. A portion having a shape of 'A' that appears white and dark is a portion to which the coating material is attached on the object to be coated 3. The reflectivity or diffusivity of the optical material with respect to the light except the visible light needs to be high enough to allow distinctive recording of a portion to which the coating material is attached and a portion to which the coating material is not attached.

Figure 15:
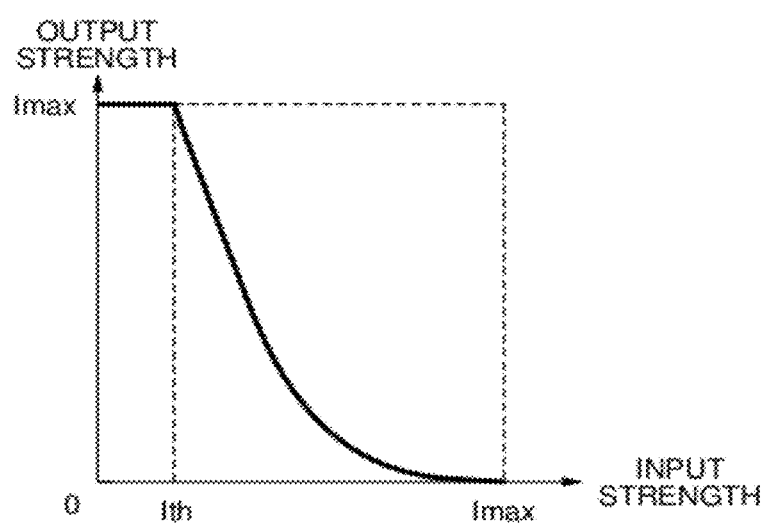
FIG. 15 is a view showing a correspondence relation between input strength and output strength used in a brightness regulation process executed by the processing part of FIG. 10.

As in the first exemplary embodiment, an image frame recorded by the detection part 5 is sent to the processing part 6 and subjected to the lens distortion correction process, the keystone distortion correction process and the brightness regulation process. However, in the brightness regulation process in the second exemplary embodiment, a correspondence relation as shown in FIG. 15 is used, and consequently, the colors of black and white of an image are inverted. As a result of the processing by the processing part, an image as shown in FIG. 5E is obtained and, by displaying the image by the display part 2a, it is possible to obtain the same effect as in the first exemplary embodiment.

[Third Exemplary Embodiment]

As a third exemplary embodiment of the present invention, a configuration in which a basic configuration is as described above but the configurations of the light source part and the detection part of an input device 1b are different from those of the exemplary embodiments described above will be described in detail with reference to the drawings.

Figure 16:
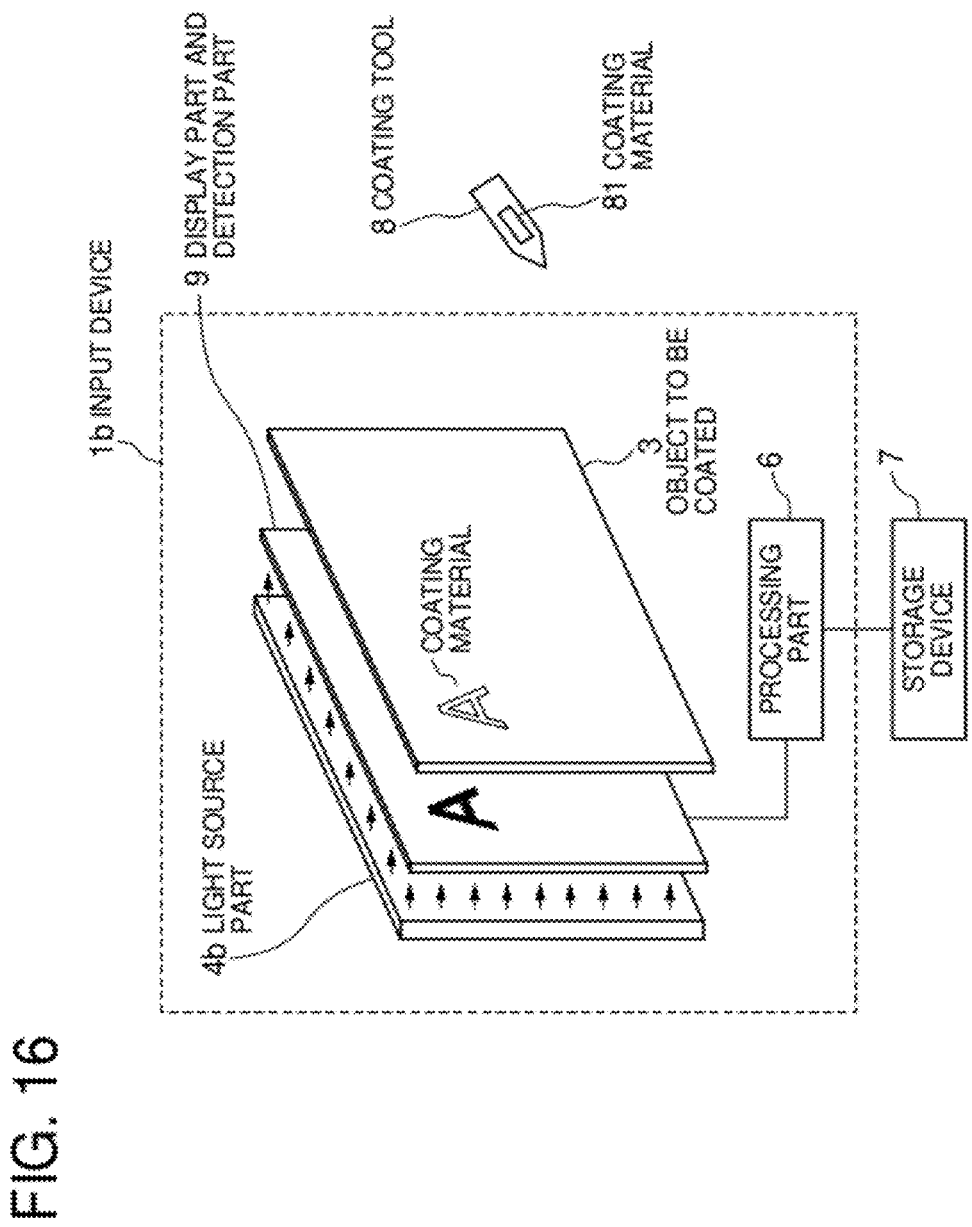
FIG. 16 is a block diagram of a third exemplary embodiment.

With reference to FIG. 16, the display part is a flat panel display using the liquid crystal technique, and is integrated with the detection part. A light source part 4b is a backlight of this flat panel display, and generates both visible light and light except the visible light. As in the second exemplary embodiment, the optical material contained in the coating material 81 is a material that is substantially transparent (or translucent) with respect to visible light but reflects light except the visible light generated by the light source part 4b.

Figure 17:
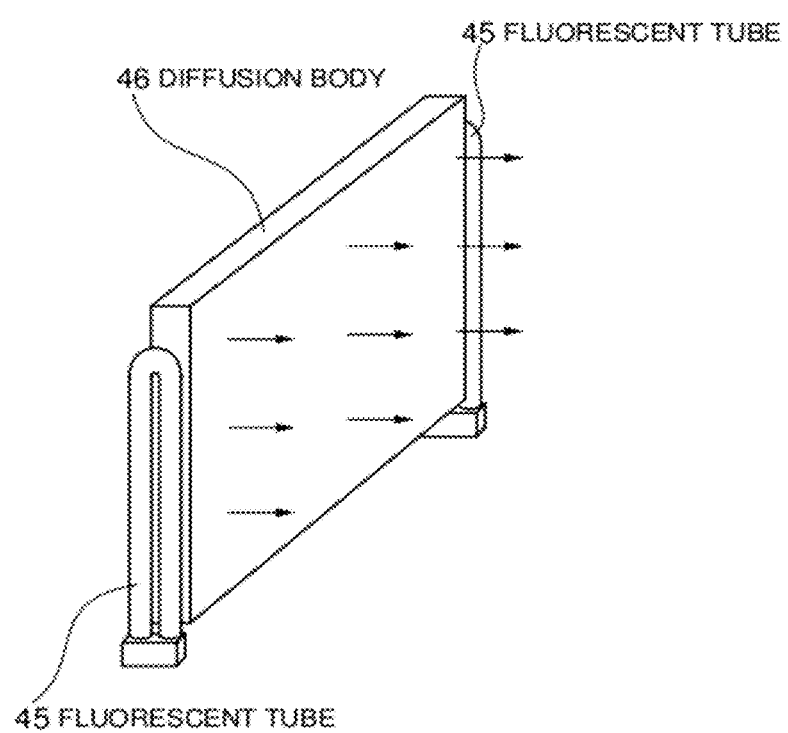
FIG. 17 is a detailed block diagram of a light source part of FIG. 16.

FIG. 17 is a block diagram showing an example of a configuration of the light source part 4b. With reference to FIG. 17, the light source part 4b includes a fluorescent tube 45 that generates both visible light and light except the visible light, and a diffusion body 46 that uniformly diffuses the light generated by the fluorescent tube 45. The fluorescent tube 45 generates both visible light and light except the visible light such as infrared light. As the fluorescent tube 45, for example, a general fluorescent lamp in which halogen gas is filled can be used. Alternatively, a device in which a visible-light-emitting diode (LED) and an infrared LED are arranged side by side may be used. As the diffusion body 46, a general diffuser panel used for a backlight of a liquid crystal display can be used. Because planar generation of both visible light and light except the visible light is sufficient, it is also possible to use, as the light source part 4b of this exemplary embodiment, an organic electroluminescence (EL) element other than the abovementioned configuration.

Figure 18:
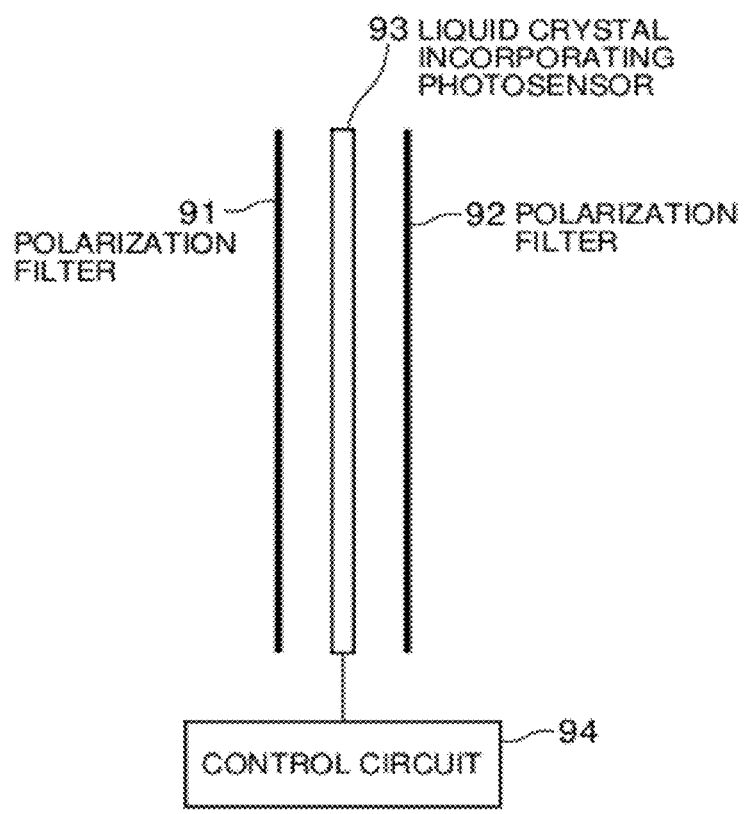
FIG. 18 is a detailed block diagram of a display part and detection part of FIG. 16.

FIG. 18 is a block diagram showing an example of the integrated display part and detection part 9. With reference to FIG. 18, the integrated display part and detection part 9 includes two polarization filters 91 and 92, a liquid crystal 93 incorporating a photosensor, and a control circuit 94. The polarization filter 91 takes out only linear polarization components that vibrate in a specific direction from unpolarized visible light generated by the light source part 4b. The polarization filter 92 takes out only linear polarization components orthogonal to the polarization filter 91 from the visible light passed through the polarization filter 91 and the liquid crystal 93 incorporating the photosensor. The liquid crystal 93 incorporating the photosensor, in a similar manner as a general liquid crystal panel, regulates the polarization state of visible light for each pixel in accordance with a voltage applied by the control circuit 94, and controls whether the visible light emitted by the light source part 4b passes through the polarization filter 92 and is displayed on the front face of the panel. It is configured so that a fixed amount of light except the visible light passes regardless of a voltage applied by the control circuit 94. For example, because, in the case of a polarization film and liquid crystal material used for a general liquid crystal display, an almost fixed amount of infrared light passes regardless of a voltage applied by the control circuit 94, it is possible to use this.

Figure 19:
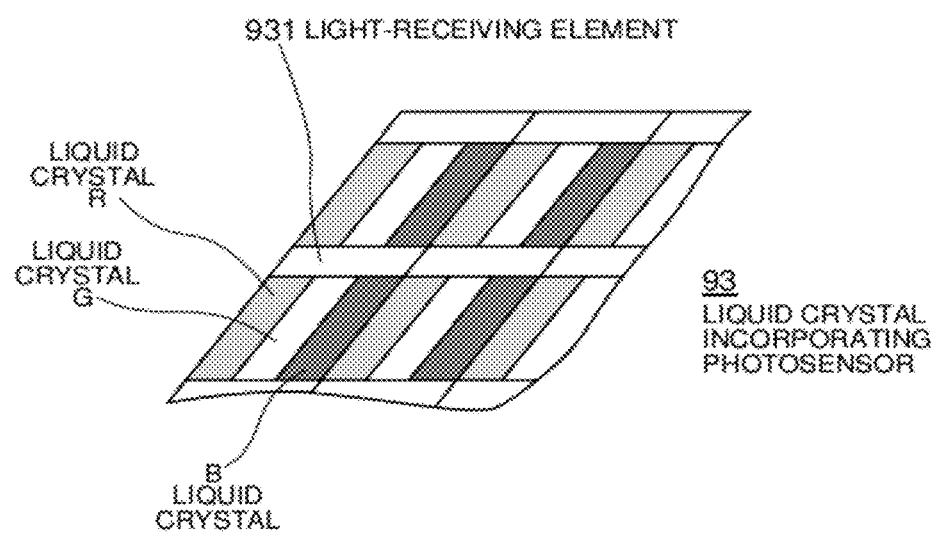
FIG. 19 is an enlarged view of a liquid crystal incorporating a photosensor of FIG. 18.

Furthermore, the liquid crystal 93 incorporating the photosensor is equipped with, in addition to the liquid crystal element that regulates a polarization state of visible light by the pixel, a light-receiving element that measures the intensity of light except the visible light by the pixel. As shown in FIG. 19, the liquid crystal 93 incorporating the photosensor includes a plurality of liquid crystal elements that regulate a polarization state of visible light by the pixel, i.e., liquid crystal elements R, G and B, and a plurality of light-receiving elements. The liquid crystal elements R, G and B, on which red, green and blue color filters are superimposed, respectively, are capable of controlling light of the respective colors. A light-receiving element 931 is an element through which electric current flows in accordance with the intensity of incident light except the visible light and may be, for example, a silicon photodiode. More specifically, the liquid crystal 93 incorporating the photosensor used in this exemplary embodiment can be configured by superimposing a visible-light cut filter on a light-receiving element part of a general liquid crystal incorporating a photosensor. In the third exemplary embodiment, a plurality of light-receiving elements 931 that are distributed on the whole face of the display function as the detection part.

An operation of the input device of the third exemplary embodiment of the present invention will be described.

The light source part 4b emits visible light and light except the visible light so as to enter from the rear face of the display part and detection part 9. The control circuit 94 of the display part and detection part 9 controls a voltage applied to each pixel in accordance with the intensity of each pixel of an image frame outputted by the processing part 6, and displays the image frame. A fixed amount of light except the visible light passes through the display part and detection part 9 regardless of the voltage applied by the control circuit 94, and enters the object to be coated 3. If the coating material is not attached to the object to be coated 3, the light except the visible light passes straight through the object to be coated 3.

The light-receiving element 931 placed for each pixel of the liquid crystal 93 incorporating the photosensor measures the light except the visible light entering thereinto by the pixel. In a case that the coating material is not attached to the object to be coated 3, the light except the visible light passes through the object to be coated 3 and is radiated outside, and therefore, hardly enters the light-receiving element 931. As a result, as in the second exemplary embodiment, an image frame recorded by the detection part (the light-receiving element 931) is almost black as shown in, for example, FIG. 13A.

On the other hand, in a case that the coating material is attached to the object to be coated 3, the light except the visible light is reflected by the optical material contained in the coating material to reach the detection part. Therefore, for example, in a case that an alphabetical letter 'A' is written, an image frame recorded by the detection part is as shown in FIG. 13B, for example. A portion shaped into 'A' that appears white and dark is a portion to which the coating material is attached on the object to be coated 3. The reflectivity of the optical material with respect to the light except the visible light needs to be high enough to allow the detection part to distinctively record a portion to which the coating material is attached and a portion to which the coating material is not attached.

As in the second exemplary embodiment, an image frame recorded by the detection part is sent to the processing part and subjected to the brightness regulation process. As a result of the processing by the processing part, an image as shown in FIG. 5E is obtained and displayed by the display part, whereby it is possible to obtain the same effect as in the first and second exemplary embodiments.

[Modified Example of the First to Third Exemplary Embodiments]

In all of the above descriptions, the coating material is substantially transparent (or translucent) with respect to visible light and contains a material that absorbs, reflects or diffuses light in a wavelength region of light emitted by the light source part, but instead, the coating material may contain, as a component, a material that is substantially opaque immediately after being applied and then brought into a substantially transparent (translucent) state. As such a material, for example, it is possible to use reversible thermochromic ink containing a temperature-sensitive color-changing material that changes color by temperature. In this case, when there is a difference of temperature between the object to be coated and the air, the temperature of the coating material changes when attached to the object to be coated, and the temperature-sensitive color-changing material thereby changes from the opaque state to the transparent (or translucent) state after a given time.

As a method for generating a difference of temperature between the object to be coated and the air, a method of using waste heat generated by the display part, or a method of flowing electric current and heating a thin-film transparent electrode of indium tin oxide (ITO) or the like formed on the surface or rear face of the object to be coated can be considered. Moreover, the object to be coated may be formed by a material with low specific heat, and a change of temperature due to heat of vaporization of the volatile solvent contained in the coating material.

In a case that a material that changes to a substantially transparent (or translucent) state after a given time from application thereof to the object to be coated is contained in the coating material, an image of the optical material contained in the coating material applied to the object to be coated is shot by the detection part and, even if some delay arises before the image is displayed by the display part, the user can speedily input a figure by using the temperature-sensitive color-changing material before changing color as a visual feedback. Therefore, with the handwriting input device of the present invention, the user can input and erase a letter and a figure as if writing and drawing by using general ink that absorbs visible light. In a dark place, the user cannot visually recognize the temperature-sensitive color-changing material before changing color. Therefore, in this case, the user can write and draw a letter and a figure at a relatively slow speed at some expense of an input speed.

[Fourth Exemplary Embodiment]

As a fourth exemplary embodiment of the present invention, a configuration in which a basic configuration is as described above but the property of the coating material is different from that of the exemplary embodiments described above will be described. In the respective exemplary embodiments, a material that is transparent (or translucent) in the visible light region is used as the coating material but, in this exemplary embodiment, a coating material that is opaque at all times regardless of a lapse of time is used. As mentioned before, the coating material contains an optical material having a property of absorbing, reflecting or diffusing light except the visible light, and may further contain a volatile solvent, a resin material, and a separating material. By using a material that is opaque in the visible light region as at least one of these components, or adding a material that is opaque in the visible light region as an extra component, it is possible to make the coating material opaque in the visible light region. Also in this case, because the coating material absorbs, reflects or diffuses light except the visible light, as a method for detecting the coating material existing on the surface of the object to be coated, it is possible to use the same method as in the first to third exemplary embodiments.

In a case that the handwriting input device of this exemplary embodiment is used in a bright place, the user observes a letter and a figure written and drawn by the coating material as it is because the coating material is opaque. On the other hand, in a case that the handwriting input device is used in a dark place, the user cannot visually recognize the coating material but can observe a letter and a figure brightly bordered by the display behind it. Thus, even when the device has a configuration of using a material that is opaque in the visible light region, it is possible to obtain an effect that the device can be used both in a bright place and a dark place.

[Fifth Exemplary Embodiment]

Figure 22:
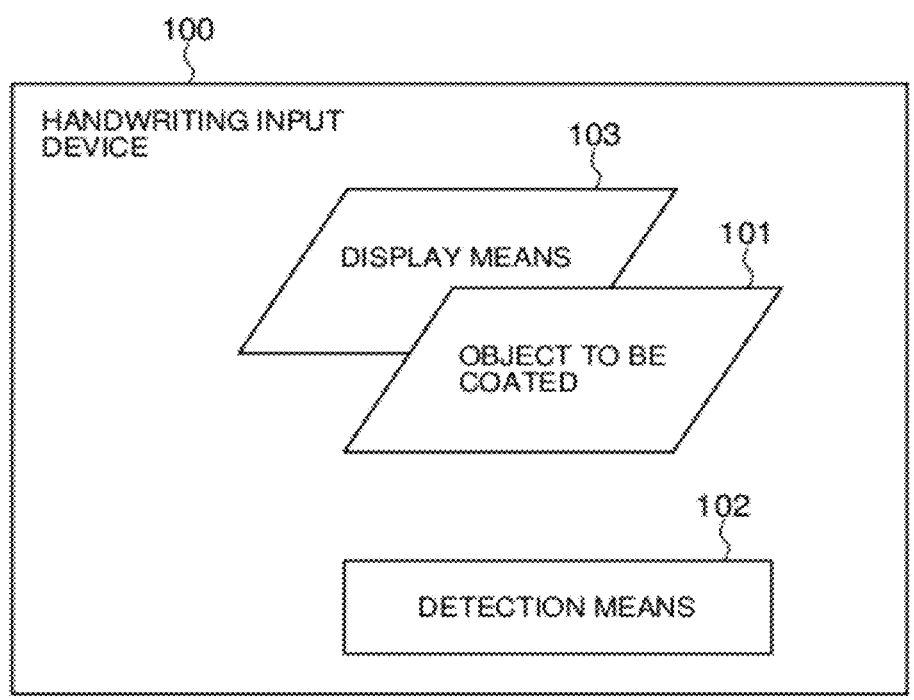
FIG. 22 is a block diagram of a fifth exemplary embodiment.

Next, a fifth exemplary embodiment of the present invention will be described with reference to FIG. 22. FIG. 22 is a block diagram showing a configuration of a handwriting input device in this exemplary embodiment. In this exemplary embodiment, the abovementioned handwriting input device will be schematically described.

As shown in FIG. 22, a handwriting input device 100 in this exemplary embodiment is equipped with: a transparent or translucent object to be coated 101; a detection means 102 configured to detect a position in which a coating material attaches on the object to be coated 101; and a display means 103 configured to cause a visual change in accordance with the position where attachment of the coating material is detected by the detection means 102.

According to the handwriting input device of this exemplary embodiment, when a letter is written or a figure is drawn by hand with the coating material on the object to be coated 101, the display means 103 causes a visual change in accordance with the position where attachment of the coating material is detected. Therefore, it is possible to recognize the written letter or the drawn figure.

Further, according to the handwriting input device of this exemplary embodiment, information of the letter or figure written or drawn by hand is stored as a distribution of the coating material physically attached to the object to be coated 101. Therefore, it is possible to prevent loss of the input information even if digital data is lost.

Further, according to the handwriting input device of this exemplary embodiment, when the coating material physically attached to the object to be coated 101 disappears, display of the written letter or drawn figure turns off because the visual change is not caused in the disappearing position. Therefore, by wiping off the coating material, it is possible to erase the letter or figure written or drawn by hand. Then, it is possible to wipe off the coating material by a general object such as tissue paper and a finger, it is possible to erase the letter or figure written or drawn by hand without using a special instrument.

Then, the handwriting input device employs a configuration that the coating material has a property of being transparent or translucent with respect to visible light.

Further, the handwriting input device employs a configuration that the coating material has a property of being opaque with respect to visible light.

Further, the handwriting input device employs a configuration that the coating material has a property of changing from an opaque state with respect to visible light to a transparent or translucent state with respect to the visible light.

Further, the handwriting input device employs a configuration that the coating material contains a volatile solvent and, in accordance with vaporization of the volatile solvent, changes from the opaque state with respect to the visible light to the transparent or translucent state with respect to the visible light.

Further, the handwriting input device employs a configuration that the coating material changes from the opaque state with respect to the visible light to the transparent or translucent state with respect to the visible light due to change in temperature.

Further, the handwriting input device employs a configuration that the coating material absorbs, reflects or diffuses light except visible light.

Further, the handwriting input device is further equipped with a light source part configured to emit the light except the visible light so as to enter the object to be coated 101.

Further, the handwriting input device employs a configuration that: the object to be coated 101 has a structure capable of guiding the light except the visible light in an internally trapped state; the light source part is configured to emit the light except the visible light so as to enter the object to be coated 101 and be guided in the internally trapped state; and the coating material 101 optically couples with part of the trapped light except the visible light on a surface of the object to be coated 101 and diffuses outside the object to be coated 101.

Further, the handwriting input device employs a configuration that: the display means 103 is a liquid crystal display; and the light source part is a backlight of the liquid crystal display.

Further, the handwriting input device employs a configuration that the light source part is a fluorescent tube generating both the visible light and the light except the visible light.

Further, the handwriting input device employs a configuration that the object to be coated 101 is a protection panel placed in front of the display means 103.

Further, the handwriting input device employs a configuration that: the display means 103 is composed of a projector and a screen; and the object to be coated 101 is the screen itself or a base member to which the screen is attached.

Further, the handwriting input device employs a configuration that the detection means 102 is configured to detect the position where the coating material attaches on the object to be coated 101 by a spatial distribution of incident intensity of the light except the visible light.

Further, the handwriting input device employs a configuration that the detection means 102 includes a semiconductor image sensor.

Further, the handwriting input device employs a configuration that the detection means 102 includes a plurality of sensors separately arranged in the display means 103.

Further, the handwriting input device employs a configuration that the sensor is a silicon photodiode.

Further, the handwriting input device employs a configuration that the light except the visible light is infrared light.

Further, a handwriting input method of another exemplary embodiment of the present invention executed by an operation of the aforementioned handwriting input device includes: detecting a position in which a coating material attaches on a transparent or translucent object to be coated 101, by a detection means 102; and causing a visual change in accordance with the position where attachment of the coating material is detected by the detection means 102, by a display means 103.

Further, the handwriting input method employs a configuration that the coating material has a property of being transparent or translucent with respect to visible light.

Further, the handwriting input method employs a configuration that the coating material has a property of being opaque with respect to visible light.

Further, the handwriting input method employs a configuration that the coating material has a property of changing from an opaque state with respect to visible light to a transparent or translucent state with respect to the visible light.

[Sixth Exemplary Embodiment]

Figure 23:
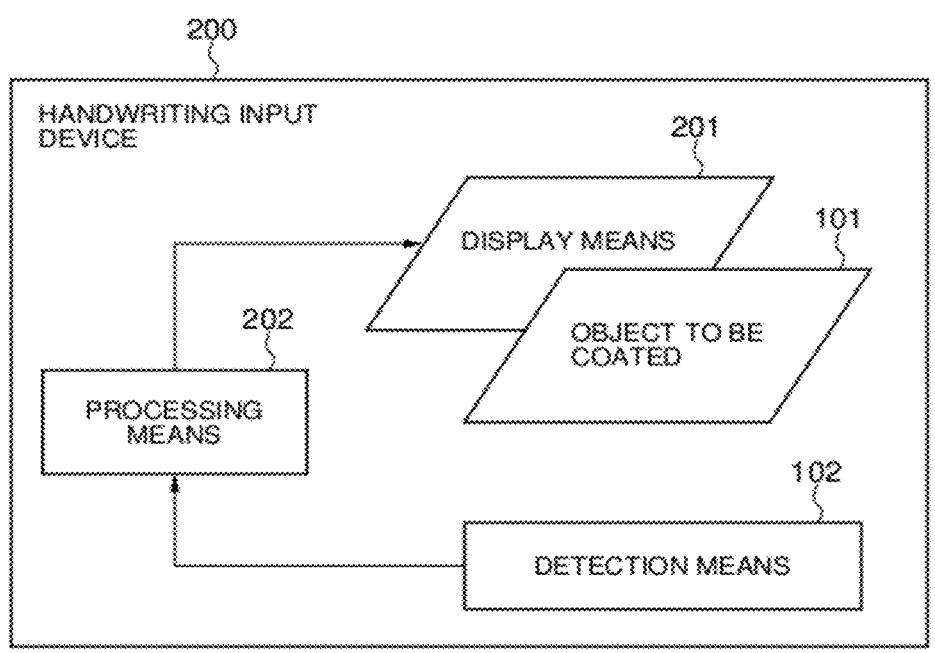
FIG. 23 is a block diagram of a sixth exemplary embodiment.
Figure 24:
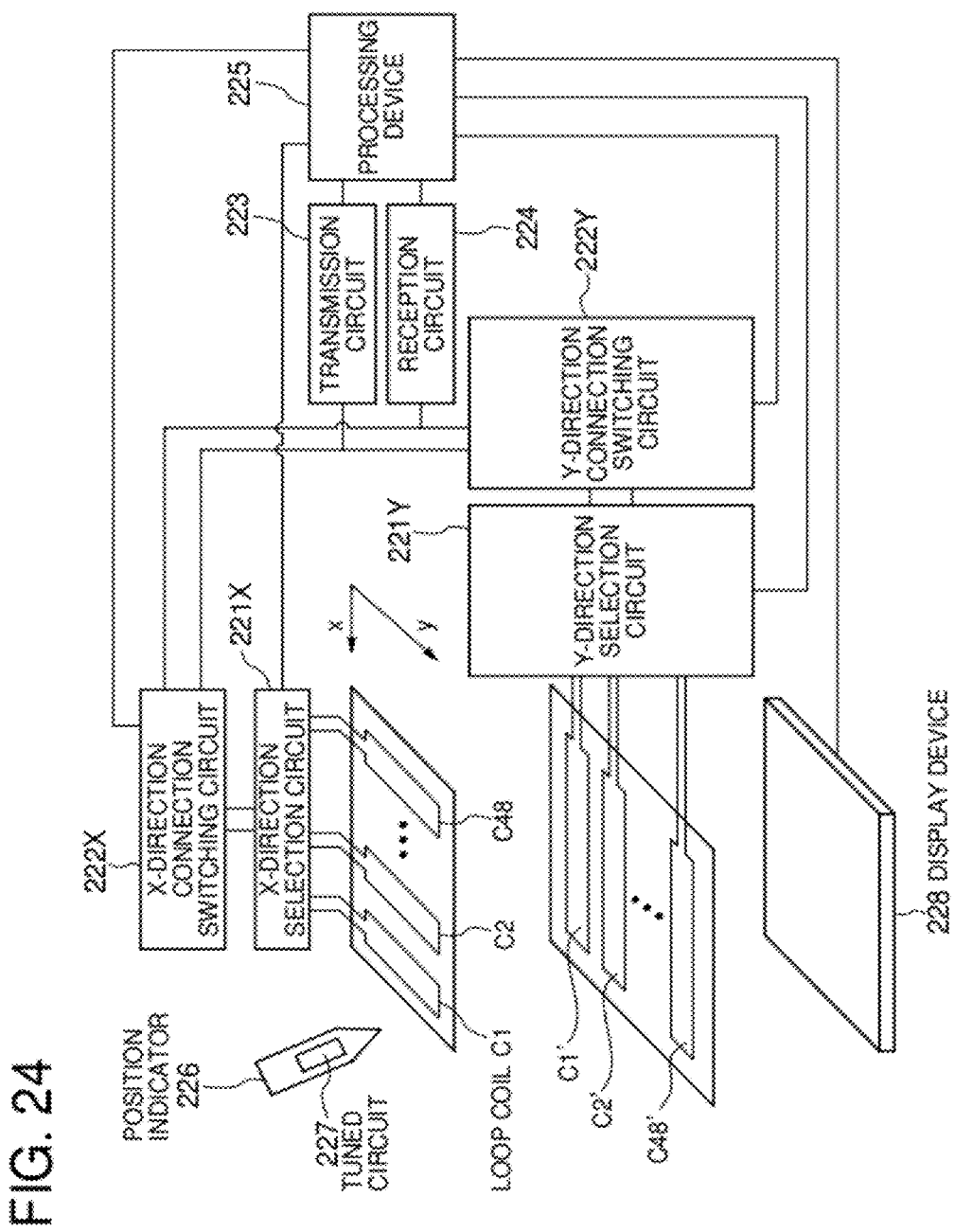
FIG. 24 is a block diagram showing an example of a handwriting input device relating to the present invention.

Next, a sixth exemplary embodiment of the present invention will be described with reference to FIG. 23. FIG. 23 is a block diagram showing a configuration of a handwriting input device in this exemplary embodiment. In this exemplary embodiment, the abovementioned handwriting input device will be schematically described.

As shown in FIG. 23, a handwriting input device 200 of this exemplary embodiment is equipped with: a transparent or translucent object to be coated 101; a detection means 102 configured to detect a position in which a coating material attaches on the object to be coated 101; and a processing means 202 configured to output, to a display device 201, a signal for causing a visual change in accordance with the position where attachment of the coating material is detected by the detection means 102.

According to the handwriting input device of this exemplary embodiment, when a letter is written or a figure is drawn by hand with the coating material on the object to be coated 101, the processing means 202 outputs, to the display device 201, a signal for causing a visual change in accordance with the position where attachment of the coating material is detected. Therefore, the written letter or the drawn figure is displayed by the display device 201, and can be recognized even in a dark place.

Further, according to the handwriting input device of this exemplary embodiment, information of the letter or figure written or drawn by hand is stored as a distribution of the coating material physically attached to the object to be coated 101. Therefore, it is possible to prevent loss of the input information even if digital data is lost.

Further, according to the handwriting input device of this exemplary embodiment, when the coating material physically attached to the object to be coated 101 disappears, display of the written letter or drawn figure turns off because the visual change is not caused in the disappearing position. Therefore, by wiping off the coating material, it is possible to erase the letter or figure written or drawn by hand. Then, it is possible to wipe off the coating material by a general object such as tissue paper and a finger, it is possible to erase the letter or figure written or drawn by hand without using a special instrument.

Then, the handwriting input device employs a configuration that the coating material has a property of being transparent or translucent with respect to visible light.

Further, the handwriting input device employs a configuration that the coating material has a property of being opaque with respect to visible light.

Further, the handwriting input device employs a configuration that the coating material has a property of changing from an opaque state with respect to visible light to a transparent or translucent state with respect to the visible light.

Further, the handwriting input device employs a configuration that the coating material contains a volatile solvent and, in accordance with vaporization of the volatile solvent, changes from the opaque state with respect to the visible light to the transparent or translucent state with respect to the visible light.

Further, the handwriting input device employs a configuration that the coating material changes from the opaque state with respect to the visible light to the transparent or translucent state with respect to the visible light due to change in temperature.

Further, the handwriting input device employs a configuration that the coating material absorbs, reflects or diffuses light except visible light.

Further, the handwriting input device is further equipped with a light source part configured to emit the light except the visible light so as to enter the object to be coated 101.

Further, the handwriting input device employs a configuration that: the object to be coated 101 has a structure capable of guiding the light except the visible light in an internally trapped state; the light source part is configured to emit the light except the visible light so as to enter the object to be coated 101 and be guided in the internally trapped state; and the coating material optically couples with part of the trapped light except the visible light on a surface of the object to be coated 101 and diffuses outside the object to be coated 101.

Further, the handwriting input device employs a configuration that the detection means 102 is configured to detect the position where the coating material attaches on the object to be coated 101 by a spatial distribution of incident intensity of the light except the visible light.

Further, the handwriting input device employs a configuration that the detection means 102 includes a semiconductor image sensor.

Further, the handwriting input device employs a configuration that the light except the visible light is infrared light.

Further, a handwriting input method of another exemplary embodiment of the present invention executed by an operation of the aforementioned handwriting input device includes: detecting a position in which a coating material attaches on a transparent or translucent object to be coated 101, by a detection means 102; and outputting, to a display device 201, a signal for causing a visual change in accordance with the position where attachment of the coating material is detected by the detection means 102, by a processing means 202.

Further, the handwriting input device employs a configuration that the coating material has a property of being transparent or translucent with respect to visible light.

Further, the handwriting input device employs a configuration that the coating material has a property of being opaque with respect to visible light.

Further, the handwriting input device employs a configuration that the coating material has a property of changing from an opaque state with respect to visible light to a transparent or translucent state with respect to the visible light.

Although the present invention has been described with reference to the respective exemplary embodiments described above, the present invention is not limited to the abovementioned exemplary embodiments. The configuration and details of the present invention can be altered within the scope of the present invention in various manners that can be understood by those skilled in the art.

The present invention is based upon and claims the benefit of priority from Japanese patent application No. 2009-099574, filed on Apr. 16, 2009, the disclosure of which is incorporated herein in its entirety by reference.

DESCRIPTION OF REFERENCE NUMERALS 1, 1a, 1b input device
2, 2a display part
21 projector
22 screen
3 object to be coated
4, 4a, 4b light source part
41 power circuit
42 driving circuit
43, 44 infrared emitting diode (LED)
45 fluorescent tube
46 diffusion body
5 detection part
51 camera module
52 CCD
53 interface part
54 lens part
55 visible-light cut filter
6 processing part
7 storage device
8 coating tool
81 coating material
82 housing
83 felt member
84 cap
9 display part and detection part 9
91, 92 polarization filter
93 liquid crystal incorporating photosensor
931 light-receiving element
1 to #4 LED
R, G, B liquid crystal element
C1 to C48, C1' to C48' loop coil
221X X-direction selection circuit
221Y Y-direction selection circuit
222X X-direction connection switching circuit 222X
222Y Y-direction connection switching circuit 222Y
223 transmission circuit
224 reception circuit
225 processing device
226 position indicator
227 tuned circuit
228 display device

The invention claimed is:

1. A handwriting input device comprising:
a transparent or translucent object to be coated capable of guiding non-visible light therewithin by total internal reflection;
a light source part configured to emit non-visible light which is incident into the object to be coated and is guided therewithin by total internal reflection;
a detection unit configured to periodically optically detect an area of the object to be coated on which a coating material has been deposited by distinguishing non-visible light transmitted from the object to be coated and through the coating material due to an optical coupling between the object to be coated and the coating material, the optical coupling thereby destroying the total internal reflection and transmitting the non-visible light through the coating material; and
a display unit configured to periodically cause a visual change in a visible image in accordance with the detection of the area of the object to be coated on which the coating material has been deposited,
wherein the coating material is physically removable from the object to be coated, and the display unit is further configured to change the visible image based on a removal of the coating material.

2. The handwriting input device according to claim 1, wherein the coating material absorbs, reflects or diffuses non-visible light.

3. The handwriting input device according to claim 1, wherein the coating material has a property of being transparent or translucent with respect to visible light.

4. The handwriting input device according to claim 1, wherein the coating material has a property of being opaque with respect to visible light.

5. The handwriting input device according to claim 1, wherein the coating material has a property of changing from an opaque state with respect to visible light to a transparent or translucent state with respect to visible light.

6. The handwriting input device according to claim 5, wherein the coating material contains a volatile solvent and, in accordance with vaporization of the volatile solvent, changes from the opaque state with respect to visible light to the transparent or translucent state with respect to visible light.

7. The handwriting input device according to claim 5, wherein the coating material changes from the opaque state with respect to visible light to the transparent or translucent state with respect to visible light due to change in temperature.

8. The handwriting input device according to claim 2, wherein:
the display unit is a liquid crystal display; and
the light source part is a backlight of the liquid crystal display.

9. The handwriting input device according to claim 8, wherein the light source part is a fluorescent tube generating both visible light and non-visible light.

10. The handwriting input device according to claim 1, wherein the object to be coated is a protection panel placed in front of the display unit.

11. The handwriting input device according to claim 1, wherein:
the display unit is composed of a projector and a screen; and
the object to be coated is the screen itself or a base member to which the screen is attached.

12. The handwriting input device according to claim 1, wherein the detection unit is configured to detect the area of the object to be coated which has been coated with the coating material by a spatial distribution of incident intensity of non-visible light.

13. The handwriting input device according to claim 12, wherein the detection unit includes a semiconductor image sensor.

14. The handwriting input device according to claim 12, wherein the detection unit includes a plurality of sensors separately arranged in the display unit.

15. The handwriting input device according to claim 14, wherein the sensor is a silicon photodiode.

16. The handwriting input device according to claim 1, wherein the emitted non-visible light is infrared light.

17. A handwriting input device comprising:
a transparent or translucent object to be coated capable of guiding non-visible light therewithin by total internal reflection;
a light source part configured to emit non-visible light which is incident into the object to be coated and be guided therewithin by total internal reflection;
a detection unit configured to periodically optically detect an area of the object to be coated on which a coating material has been deposited by distinguishing non-visible light transmitted from the object to be coated and through the coating material due to an optical coupling between the object to be coated and the coating material, the optical coupling thereby destroying the total internal reflection and transmitting the non-visible light through the coating material; and
a processing unit configured to periodically output, to a display device, a signal for causing a visual change in a visible image in accordance with detection of the area of the object to be coated on which the coating material has been deposited,
wherein the coating material is physically removable from the object to be coated, and the processing unit is further configured to change the visible image based on a removal of the coating material.

18. A handwriting input method executed by a handwriting input device having a transparent or translucent object to be coated capable of guiding non-visible light therewithin by total internal reflection, a light source part, a detection unit and a display unit, the handwriting input method comprising:
emitting non-visible light incident into the object to be coated and guided therewithin by total internal reflection, by the light source part;
periodically optically detecting, by the detection unit, an area of the object to be coated on which a coating material has been deposited by distinguishing non-visible light transmitted from the object to be coated and through the coating material due to an optical coupling between the object to be coated and the coating material, the optical coupling thereby destroying the total internal reflection and transmitting the non-visible light through the coating material;
periodically causing a visual change in a visible image in accordance with the detection of the area of the object to be coated on which the coating material has been deposited; and
changing the visible image based on a removal of the coating material,
wherein the coating material is physically removable from the object to be coated.

* * * * *